March 28, 1950   H. J. WOOD   2,502,194
EXPANSION MEANS FOR COOLING AIRCRAFT CABINS
Filed April 22, 1946   2 Sheets-Sheet 1
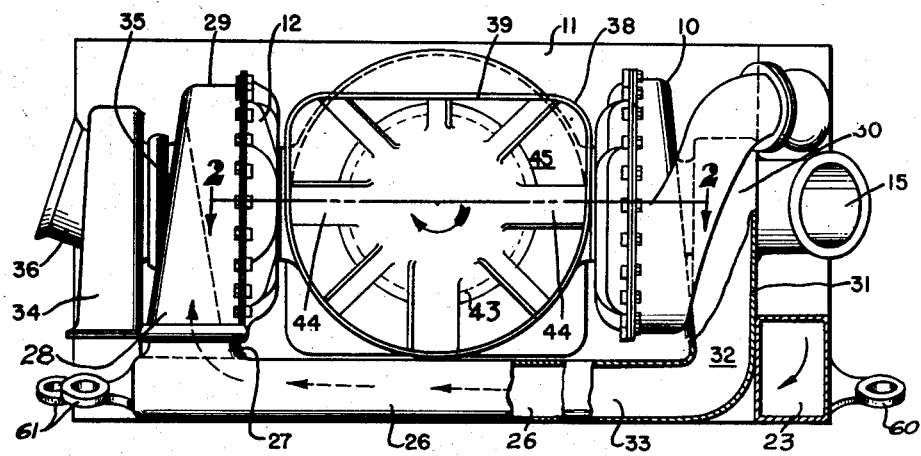
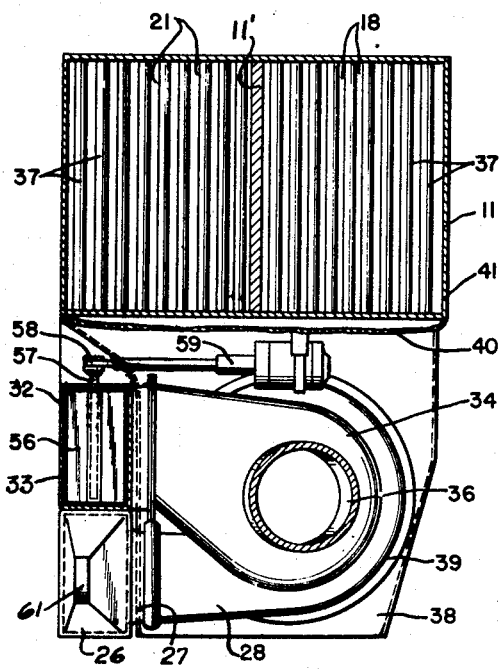
INVENTOR.
HOMER J. WOOD
BY
ATTORNEY

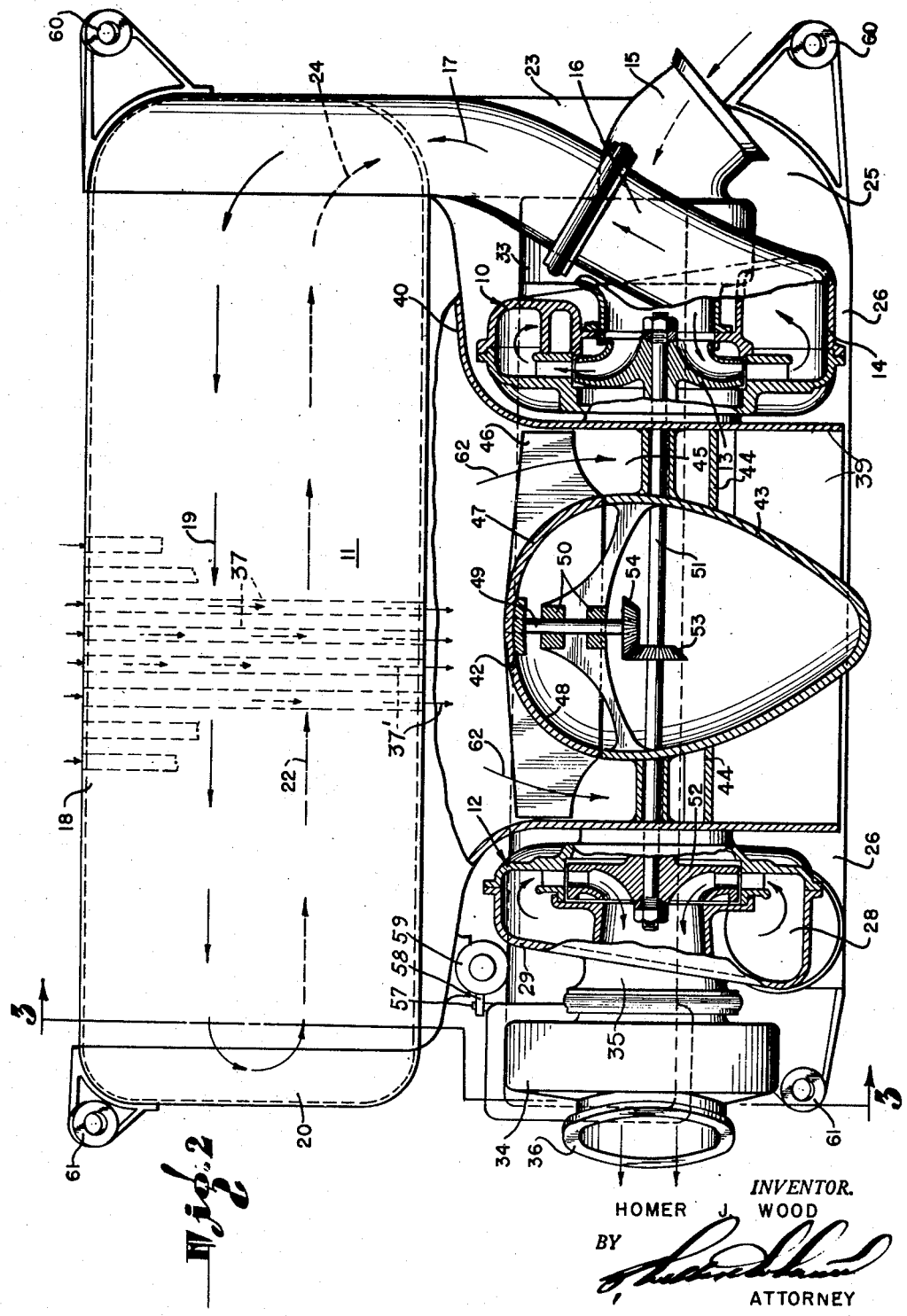

Patented Mar. 28, 1950

2,502,194

UNITED STATES PATENT OFFICE 2,502,194

EXPANSION MEANS FOR COOLING AIRCRAFT CABINS

Homer J. Wood, Los Angeles, Calif., assignor to The Garrett Corporation, Los Angeles, Calif., a corporation of California Application April 22, 1946, Serial No. 663,931

13 Claims. (Cl. 62—136)

My invention relates to air cooling systems wherein air to be cooled is compressed, cooled, and then expanded through an air motor, such as a turbine, for example, whereby some of the power utilized in compressing the air may be recovered, and an efficient cooling of the air accomplished. In such systems the air may be further conditioned by extraction or addition of moisture for the purpose of imparting thereto to a desired humidity.

It is an object of the invention to provide a simple and compact assembly of parts which may be used in refrigerating systems of this character, but which is especially adapted for use in aircraft due to its compactness and light weight.

A feature of the invention is that this assembly of parts may be readily installed and removed as a unit. For example, it may be installed in an aircraft during summer when cooling of the aircraft air is desired, and may be removed during the winter months, or may be replaced at such time by air heating equipment.

It is an object of the invention to provide for use in an air cooling system a device including an air compressor and an expansion air motor associated with a heat exchanger which connects the outlet of the compressor with the inlet of the air motor, whereby power recovered from the compressed air may be applied to the compressor and may be also utilized to operate air pumping means for moving coolant air through the heat exchanger.

It is a further object of the invention to provide an air cooling mechanism which may be made into a unit adapted to be relatively quickly and easily installed and removed, this device having an air expansion turbine and a compressor in spaced relation and in axial alignment on opposite sides of a structure by which the casings of the turbine and the compressor are supported, this supporting structure incorporating an air duct with a fan therein adapted to be driven from the shaft which extends from the rotor of the turbine to the rotor of the compressor.

A further object of the invention is to provide a refrigerating unit of the character set forth in the preceding paragraph having as a built in part of the structure a heat exchanger through which coolant air is moved by the fan, and having a valved bypass duct connecting the inlet of the compressor with the outlet of the turbine, whereby the quantity of air passed through the compressor, the heat exchanger and the expansion turbine may be proportioned in accordance with the need for cooling the air.

Further objects and advantages of the invention may be brought out in the following part of the specification.

Referring to the drawings which are for illustrative purposes only,

Fig. 1 is a partly sectioned front view of a preferred embodiment of my invention.

Fig. 2 is a plan view corresponding to Fig. 1, partly sectioned as indicated by the line 2—2 of Fig. 1.

Fig. 3 is a cross section taken as indicated by the line 3—3 of Fig. 2.

The refrigerating equipment shown in the drawings includes a supercharger or compressor 10, and an inter-cooler or heat exchanger 11 divided into upper and lower portions 18 and 21 by a wall 11', and an expansion air motor 12 of turbine form. The compressor is of rotary or centrifugal form and has a rotor 13 operating within a casing 14. This rotor 13 takes air from the compressor inlet 15 and forces this air through the casing 14 and duct members 16, as indicated by the arrows 17 of Fig. 2. From the outlet duct members 16 of the compressor 10, the air passes into the upper portion 18 of the heat exchanger 11 and travels horizontally through the upper portion of the exchanger 11 as indicated by arrows 19. At the leftward end of the heat exchanger 11, the air passes downwardly through a vertical passage member 20 to the leftward end of the lower pass 21 of the heat exchanger 11 and travels through the lower portion 21, as indicated by dotted arrows 22. From the rightward or outlet end of the portion 21 of the heat exchanger 11 the now cooled air passes into a duct 23 as indicated by arrows 24, this duct 23, as shown in Fig. 2, extending forward under the inlet 15 and being connected by an L-shaped duct portion 25 with a longitudinal duct portion 26 which, as indicated in Fig. 1, communicates through an upwardly faced outlet 27 with the inlet 28 of the turbine housing 29.

The inlet 15 includes an enlargement 30 which connects with the rightward vertical extension 31 of a bypass duct 32. This bypass duct 32 has a horizontal portion 33 extending under the compressor 10 and the turbine 12 to a riser duct member 34 which communicates through an enlargement 35 with the outlet 36 of the turbine 12.

Across the upper and lower portions 18 and 21 of the heat exchanger 11 tubes 37 are extended for conducting a coolant in heat exchange relation to the air which passes through the heat exchanger 11. The coolant employed in this device comprises a flow of air such as ambient atmospheric air which is brought in through a duct to the heat exchanger.

In connection with the heat exchanger there is pumping means for causing movement of air either by compression or by suction through the coolant passages formed by the tubes 37 of the heat exchanger 11 which are shown in full lines in Fig. 3 and indicated by dotted lines in Fig. 1, wherein the flow of air through the tubes is indicated by arrows 37'. This means for producing movement of air through the coolant passages of the heat exchanger 11 is embraced in a supporting structure 38 which is disposed between and connects together the casings or housings 14 and 29 of the compressor 10 and the turbine 12.

The supporting structure 38 embraces a tubular wall 39 disposed in transverse relation to the compressor 10 and the turbine 12. The far end of the tubular wall 39 has a flared portion 40, for connection with the near end 41 of the heat exchanger 11. Within the tubular wall 39 there is a filler body 43 supported by diffuser webs 44 in such position as to form within the wall 39 an annular throat 45. Movement of air through the throat 45 is accomplished by a fan 42 having blades or vanes 46 mounted on a rounded hub 47, the periphery 48 of which hub merges with the filler body 43. The fan member, consisting of the parts 46 and 47, is supported by a shaft 49 carried by bearings 50 supported internally of the hollow members 43 and 47. A drive connection for the fan 42 is taken off from a shaft 51 which extends across the supporting structure and also traverses the hollow body 43, so as to carry power recovered by the rotor 52 of the turbine 12 to the rotor 13 of the compressor 10. This take-off consists, in the present instance, of a bevel gear 53 fixed on a shaft 51, adapted to drive a bevel gear 54 which is fixed on the shaft 49.

For control of air through the bypass duct 32 a valve 56 is provided, which is mounted on a shaft 57 extended within the duct 32 as shown in Fig. 3. This shaft 57 has on its outer end a crank 58 adapted to be swung by a motivating means 59, such as an electric motor or a hydraulic cylinder and piston arrangement, between closed and open positions, in accordance with the need for cooling of the air which is passed through the refrigerating unit.

All of the cooperating parts of the refrigerating mechanism hereinbefore described are connected together so as to form a unit of compact form and relatively light weight which may be readily installed and removed. The unitary structure is provided with mounting brackets 60 and 61 arranged at opposite ends thereof.

In the operation of the refrigerating unit, air under compression is delivered to the inlet 15 leading to the compressor 10. This air passes through the compressor 10 and through the heat exchanger 11, provided the valve 56 of the bypass 32 is closed. In a cooled condition, the compressed air is delivered to the turbine 12 wherein it passes through the inter-vane passages of the turbine rotor 52. At this time the air is expanded and a portion of the energy released in the reduction of the air pressure as it passes through the inter-vane spaces of the turbine drives the turbine rotor 52 so that there is a recovery of power, such recovered power being carried by the shaft 51 to the rotor 13 of the compressor 10 to drive this compressor. A portion of this recovered power is transmitted from the shaft 51 through the gears 53 and 54 to the shaft 49 so that the fan 42 will be revolved and will produce movement of coolant air through the coolant passages formed by the tubes 37 of the heat exchanger 11. In the present form of the invention the fan 42 produces a flow of coolant air through the heat exchanger 11 by suction effect. That is to say, the blades 46 of the fan 42 force air through the throat 45 in the direction of the arrows 62, Fig. 2, so as to produce a reduction in pressure at the near end 41 of the heat exchanger, constituting a suction effect at the near end of the heat exchanger.

I claim as my invention:

1. In a refrigerating unit of the character described, the combination of: an air inlet member; an air compressor to receive air from said air inlet member; an expansion air motor having an air outlet; a heat exchanger having air ducting for said air and ducting for a coolant, said air ducting connecting the outlet of said compressor with the inlet of said expansion air motor; power transmission means connecting the moving parts of said compressor with the moving parts of said air motor; pumping means between said compressor and said air motor for moving air through said coolant ducting of said heat exchanger; a power connection for driving said pumping means from said power transmission means; and a valved bypass connecting said inlet of said compressor with said outlet of said air motor.

2. In a refrigerating unit of the character described, the combination of: an air compressor and an air motor in spaced relation; a supporting structure connecting the casing of said compressor and the casing of said motor together, said structure comprising an air duct; air pumping means in said air duct for moving air therethrough; a shaft traversing said supporting structure from said compressor to said motor for transmitting power from said motor to said compressor; a power take off from said shaft for driving said pumping means; and a bypass connecting the inlet of said compressor to the outlet of said motor.

3. In a refrigerating unit of the character described, the combination of: an air compressor and an air motor in spaced relation; a supporting structure connecting the casing of said compressor and the casing of said motor together, said structure comprising an air duct; air pumping means in said air duct for moving air therethrough; a shaft traversing said supporting structure from said compressor to said motor for transmitting power from said motor to said compressor; a power take off from said shaft for driving said pumping means; a heat exchanger having air passages connecting the outlet of said compressor with the inlet of said motor; coolant passage means, one end of which is connected to said air duct of said supporting structure; and a valved bypass connecting the inlet of said compressor to the outlet of said motor.

4. In a refrigerating unit of the character described, the combination of: an air compressor and an air motor in spaced relation; a supporting structure connecting the casing of said compressor and the casing of said motor together, said structure comprising a transverse cylindrical air duct; a filler body in said air duct defining an annular throat therein; a fan having peripheral vanes acting to move air through said throat; a shaft traversing said supporting structure from said compressor to said motor for transmitting power from said motor to said compressor; and a power take off from said shaft for driving said fan.

5. In a refrigerating unit of the character described, the combination of: an air compressor and an air motor in spaced relation; a supporting structure connecting the casing of said compressor and the casing of said motor together, said structure comprising a transverse cylindrical air duct; a filler body in said air duct defining an annular throat therein; a fan having peripheral vanes acting to move air through said throat; a shaft traversing said supporting structure from said compressor to said motor for transmitting power from said motor to said compressor; a power take off from said shaft for driving said fan; a heat exchanger having air passages connecting the outlet of said compressor with the inlet of said motor; and coolant passage means, one end of which is connected to said air duct of said supporting structure.

6. In a refrigerating unit of the character described, the combination of: an air compressor and an air motor in spaced relation; a supporting structure connecting the casing of said compressor and the casing of said motor together, said structure comprising a transverse cylindrical air duct; a filler body in said air duct defining an annular throat therein; a fan having peripheral vanes acting to move air through said throat; a shaft traversing said supporting structure from said compressor to said motor for transmitting power from said motor to said compressor; a power take-off from said shaft for driving said fan; and a bypass connecting the inlet of said compressor to the outlet of said motor.

7. In a refrigerating unit of the character described, the combination of: an air compressor and an air motor in spaced relation; a supporting structure connecting the casing of said compressor and the casing of said motor together, said structure comprising a transverse cylindrical air duct; a filler body in said air duct defining an annular throat therein; a fan having peripheral vanes acting to move air through said throat; a shaft traversing said supporting structure from said compressor to said motor for transmitting power from said motor to said compressor; a power take off from said shaft for driving said fan; a heat exchanger having air passages connecting the outlet of said compressor with the inlet of said motor; coolant passage means, one end of which is connected to said air duct of said supporting structure; and a valved bypass connecting the inlet of said compressor to the outlet of said motor.

8. In a refrigerating unit of the character described, the combination of: an air compressor and an air motor in spaced relation; a supporting structure connecting the casing of said compressor and the casing of said motor together, said structure comprising a transverse air duct; a filler body in said air duct defining an annular throat therein; a fan having vanes acting to move air through said throat; a shaft traversing said supporting structure from said compressor to said motor for transmitting power from said motor to said compressor; and a power take off from said shaft for driving said fan.

9. In a refrigerating unit of the character described, the combination of: an air compressor and an air motor in spaced relation; an air duct; air propelling means in said air duct for moving air therethrough; a power transmission means connecting the moving parts of said compressor with the moving parts of said air motor; a power take-off from said transmission means for driving the air propelling means; and an airflow connection between the inlet of said compressor and the outlet of said motor.

10. In a refrigerating unit of the character described, the combination of: an air compressor and an air motor in spaced apart relation; an air duct positioned in the space between said motor and compressor; air propelling means in said air duct for moving air therethrough; power transmission means connecting the moving parts of said motor, compressor and air propelling means; and a supporting structure defining a plurality of ducts including an airflow connection between the compressor inlet and air motor outlet.

11. In a refrigerating unit of the character described, the combination of: an air compressor and an air motor in spaced apart relation; an air duct positioned in the space between said motor and compressor; air propelling means in said air duct for moving air therethrough; power transmission means connecting the moving parts of said motor, compressor and air propelling means; and a supporting structure defining a plurality of ducts including airflow connections between the outlet of the compressor and the inlet of the air motor, and between the inlet of the compressor and the outlet of the motor.

12. In a refrigerating unit of the character described, the combination of: an air compressor and an air motor in spaced apart relation; an air duct positioned in the space between said motor and compressor; air propelling means in said air duct for moving air therethrough; power transmission means connecting the moving parts of said motor, compressor and air propelling means; a supporting structure defining a plurality of ducts including airflow connections between the outlet of the compressor and the inlet of the air motor, and between the inlet of the compressor and the outlet of the motor; and means for regulating the airflow through the latter connection.

13. In a unit of the character described for use with a heat exchanger, the combination of: a hollow wall structure defining a transverse air passage arranged for connection to the coolant passages of said heat exchanger; an air compressor housing fixed to one side of said hollow wall structure; an air motor housing fixed to the opposite side of said wall structure; shaft means extending from said air motor housing through said hollow wall structure to said air compressor housing; an impeller in said air compressor housing driven by said shaft means; a rotor in said air motor housing connected to the opposite end of said shaft means so as to drive the same; air propelling means in said transverse air passage of said hollow wall structure, said air propelling means having a propeller mounted for rotation on an axis substantially parallel to said transverse air passage; and a drive connection between said shaft means and said air propelling means to drive the same.

HOMER J. WOOD.

REFERENCES CITED

The following references are of record in the file of this patent:

UNITED STATES PATENTS

| Number | Name | Date |
| --- | --- | --- |
| 2,046,314 | Benkly | July 7, 1936 |
| 2,304,151 | Crawford | Dec. 8, 1942 |